H. M. CROSS.
COMBINED COVER AND CARRIER FOR BOTTLES.
APPLICATION FILED JAN. 29, 1916.
1,198,195.
Patented Sept. 12, 1916.
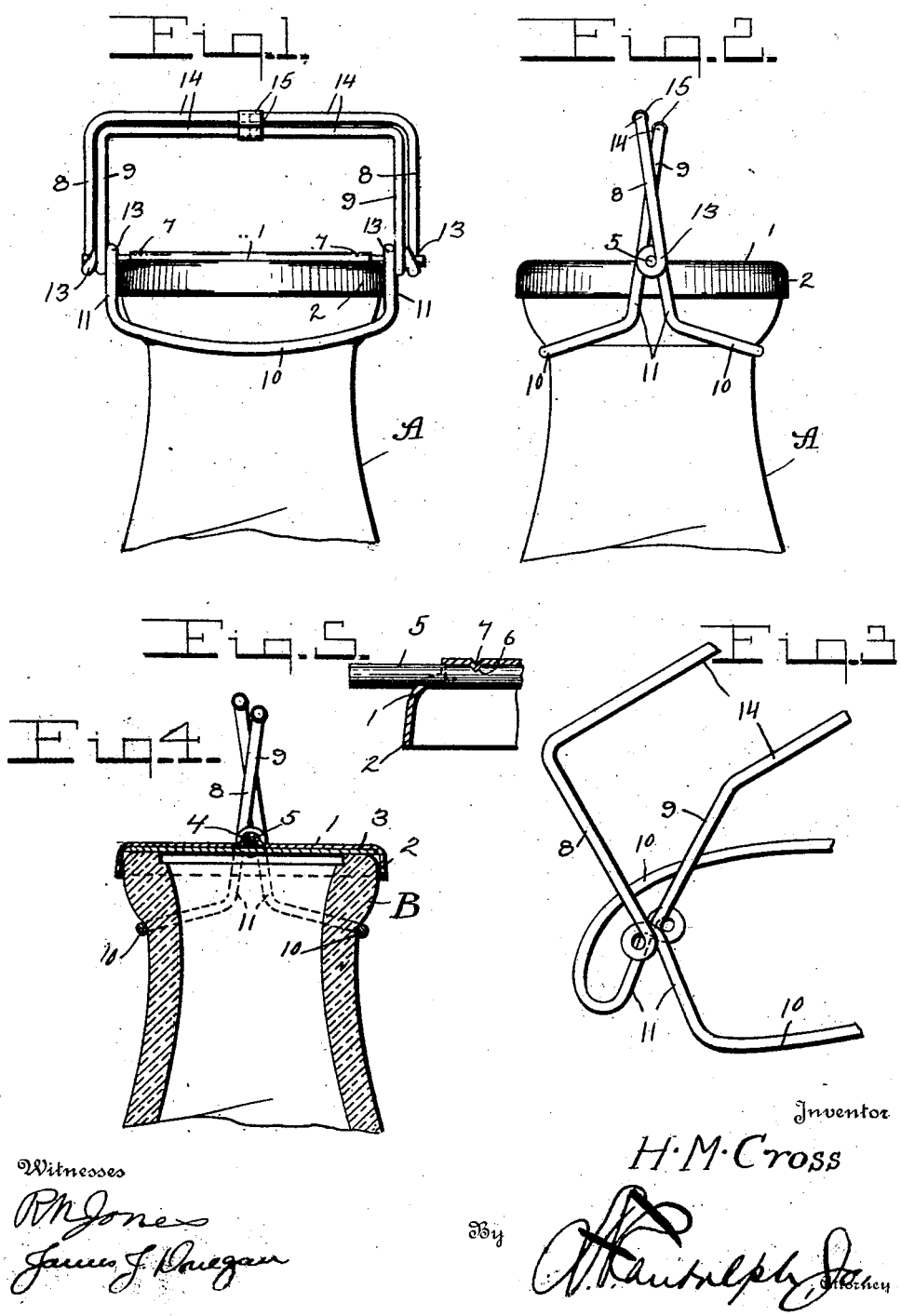
Witnesses
RN Jones
James J. Onegan
Inventor
H. M. Cross
By

UNITED STATES PATENT OFFICE.

HORACE M. CROSS, OF TOPEKA, KANSAS, ASSIGNOR OF THREE-FIFTHS TO FRANK C. THOMPSON, OF TOPEKA, KANSAS.

COMBINED COVER AND CARRIER FOR BOTTLES.

1,198,195.

Specification of Letters Patent.    Patented Sept. 12, 1916.

Application filed January 29, 1916. Serial No. 75,062.

*To all whom it may concern:*

Be it known that I, HORACE M. CROSS, a citizen of the United States, residing at Topeka, in the county of Shawnee and State of Kansas, have invented certain new and useful Improvements in Combined Covers and Carriers for Bottles; and I do hereby declare the following to be a full, clear, and exact description of the invention, such as will enable others skilled in the art to which it appertains to make and use the same.

The primary object of this invention is to provide a novel type of combined cover and carrier for milk bottles, that will positively seal the mouth of the bottle when applied thereto, and will also admit of the bottle being conveniently carried.

A further object of the invention is to provide a device for carrying out the above object, that will be of simple construction, cheap to manufacture, will be durable and efficient in operation.

Other objects will appear and be better understood from that embodiment of my invention of which the following is a specification, reference being had to the accompanying drawing forming a part thereof, in which:

Figure 1 is a view of the neck of a milk bottle, and showing a side view of the combined carrier and cover applied thereto, Fig. 2 is an end view of the device shown in Fig. 1, Fig. 3 is a detail perspective view of the carrier removed from the cover of a milk bottle, and showing the same in open position so as to be inserted over the mouth of the milk bottle, Fig. 4 is a vertical sectional view, taken through Fig. 2, and Fig. 5 is a sectional detail view of the means for connecting the rod which connects the cover to the carrier.

Referring to the drawing more in detail, the letter A designates the neck of a milk bottle, having the ordinary annular lip B formed on the upper end or mouth thereof.

The combined cover and carrier consists of a cap 1 adapted to removably fit over the mouth of a milk bottle and is provided with an annular depending flange 2 adapted to engage around the sides of the lip B, the said cap having a paraffin coated disk 3 located on its interior and overlying the upper edge of the lip B of the milk bottle. The cap 1 is provided with a diametrically extending raised portion or rib 4, which is of substantially U-shape in cross section, as shown in Fig. 4, and has the opposite ends of its interior opening into the edge of the cap, as shown in Fig. 5 of the drawing. A rod 5 extends through the raised portion or rib 4, and overlies the disk 3 and has its opposite ends projecting through the ends of the rib and beyond the edge of the cap disk 1, as shown in Fig. 1 of the drawing. The rod 5 has that portion which is disposed inwardly of the rib, provided with notches 6, which receive lugs 7 formed by inward depressions of the upper side of the rib at the opposite ends thereof, so as to prevent radial movement of the rod 5.

Associated with the disk or cap 1, is a pair of carrying members designated 8 and 9. Each of the members is formed of a single length of wire bent upon itself to provide a curved gripping portion 10, adapted to engage the outer side of the milk bottle neck, below the rib B, the strands of the wire being continued upwardly and outwardly from the curved portion 10, as shown at 11, and coiled to provide eyes 13 and 14, the ends of the strands being then continued vertically from the eyes 13 and terminally bent inwardly at right angles, as shown at 14, the terminals of the strands of each piece of wire being received by a sleeve 15, which connects the terminals and is to be secured thereto in any suitable manner. The extended portions 14 are spaced a distance above the upper side of the top or disk 1 and provide handles by means of which the milk bottle can be conveniently carried.

As shown in the drawing the strands of wire which extend from one gripping portion 10 are arranged in intersecting relation with the strands which extend from the companion gripping portions 10 of the other piece of wire, and the eyes or coils on the adjacent strands aline, so as to receive the extended ends of the rod 5 carried by the cap or disk 1. The vertical portions of the strands of the member 8, are spaced a greater distance from each other, than the vertical portions of the strands of the member 9, so as to admit of the member 9 being passed between the vertical parts of the strands of the member 8, as shown in Fig. 3, so that when the horizontal portions 14 are moved away from each other, as shown in Fig. 3, the curved clamping portions 10 will likewise be moved away from each other so as to admit of the latter being passed over the lip B of the bottle and beneath the said lip, so that when the horizontal portions are again moved toward each other the curved gripping portions will engage the sides of the bottle neck beneath the lip B and admit of the bottle being carried by the horizontal portions 14.

Having thus described my invention what I claim as new is:

1. A device of the class described comprising a cap having a raised hollow portion extending diametrically across the same, and having its opposite ends opened, a rod located within the raised hollow portion and having its opposite ends extending through the open ends of the raised hollow portion, the said rod having notches formed therein, lugs depending from the inner side of the raised hollow portion and engaging in the notches in the rod, and clamping members associated with the opposite ends of the rod.

2. A device of the class described comprising a cap, a rod extending across the cap and having its opposite ends extending beyond the edges of the cap, clamping members associated with the cap and each formed of a single piece of wire bent to provide a gripping portion and having the strands thereof extending vertically from the gripping portion and coiled to provide eyes and terminally extended horizontally and disposed in spaced relation upon the cap, the vertical portions of the strands of one piece of wire being arranged in intersecting relation with the vertical portions of the strands of the other piece of wire, and the eyes formed in the adjacent vertical portions being alined for the reception of the ends of the said rods.

3. A device of the class described comprising a cap, a rod extending across the cap and having its opposite ends extending beyond the edges of the cap, clamping members associated with the cap and each formed of a single length of wire bent to provide a gripping portion and having the strands thereof extending vertically from the gripping portion and terminally extended horizontally and disposed in spaced relation to the cap, means for pivotally connecting the vertical portions of the strands to the rods, and means connecting the adjacent terminals of the strands of each piece of wire to each other.

In testimony whereof I affix my signature in presence of two witnesses.

HORACE M. CROSS.

Witnesses:
CHAS. W. KOHL,
J. BEHLER.